July 8, 1947. E. H. CARNARIUS 2,423,580
METHOD OF STERILIZING CARBOHYDRATES AND APPARATUS THEREFOR
Filed Oct. 13, 1943
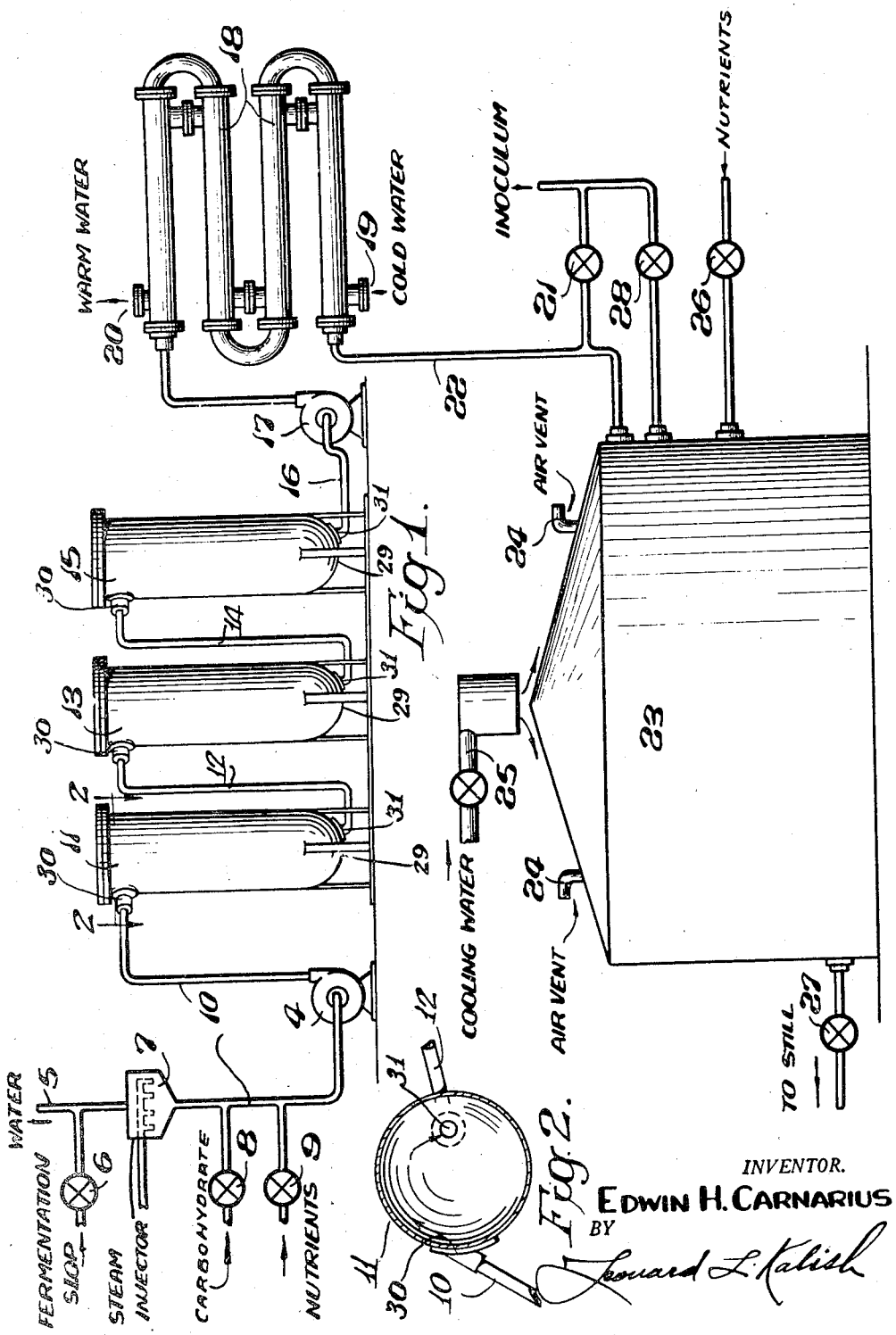
INVENTOR.
Edwin H. Carnarius
BY
Leonard L. Kalish Patented July 8, 1947

2,423,580

UNITED STATES PATENT OFFICE 2,423,580

METHOD OF STERILIZING CARBOHYDRATES AND APPARATUS THEREFOR

Edwin H. Carnarius, Wynnewood, Pa., assignor to Publicker Industries Inc., a corporation of Pennsylvania Application October 13, 1943, Serial No. 506,050

6 Claims. (Cl. 195—103)

The present invention relates to fermentation of carbohydrates to alcohols and it relates more particularly to the fermentation of carbohydrates to butyl alcohol and acetone.

An object of the present invention is to provide a new and useful process for the fermentation of carbohydrates to alcohols. Another object of the present invention is to provide a simple, economical and efficient process for the sterilization of a carbohydrate mash preparatory to the alcoholic fermentation thereof. A further object of the present invention is to provide a process for the continuous sterilization of a carbohydrate mash preparatory to the alcoholic fermentation thereof. Still another object of the present invention is to provide new and useful apparatus for the sterilization of a carbohydrate mash preliminary to the alcoholic fermentation thereof.

Other objects and advantages of the present invention are apparent in the following detailed description, appended claims and accompanying drawings.

In the alcoholic fermentation of carbohydrates, it is essential that the carbohydrate mash first prepared be sterilized preliminary to the inoculation and fermentation thereof, in order that there be no undesirable bacterial action from impurities such as would otherwise cause contamination and loss in yield.

While such preliminary sterilization is generally important in virtually all industrial fermentations, it is of especial significance in such fermentations as the butanol-acetone fermentation in which sterility of the mash is absolutely essential to the successful industrial operation of the process.

In the past, it has been necessary, in order to attain the high degree of sterility required in an industrial butanol-acetone fermentation, to employ the batch system of sterilization. That is, it has, in the past, been necessary to prepare the mash in one or more tanks employing suitable agitation etc. After a smooth mash was thus obtained, it has been necessary to pump the mash to one or more sterilizing tanks where the mash was retained, agitated, and heated with steam for a time sufficient to attain the desired degree of sterility, whereupon the mash was again pumped to fermentation tanks where it was inoculated and fermented.

The novel process and apparatus of the present invention for the first time permit the preparation and sterilization of the mash to be carried on as a continuous process, which is greatly superior to the conventional batch operation in simplicity of operation and in simplicity of equipment.

Thus, in carrying out fermentations according to the present invention, there is no need for frequent opening and closing of numerous valves, manholes, vents, etc. There is no need for the frequent cleaning of equipment required in the batch system. There is a saving of many hours over the inefficient start-and-stop operations of the batch system and a corresponding increase in the output obtainable from an industrial fermentation unit.

Furthermore, the equipment involved in the present process is much simpler and less expensive than that required in the batch process since there is no need for mechanical agitation, and since there is greatly simplified introduction of steam. Additionally the equipment employed in the present process is not only lesser in amount but also more compact in arrangement, with a corresponding saving in floor space.

For the purpose of illustrating the invention, there is shown in the accompanying drawings one form thereof which is at present preferred, since the same has been found in practice to give satisfactory and reliable results, although it is to be understood that the various instrumentalities of which it consists can be variously arranged and organized and that the invention is not limited to the precise arrangements and organizations of the instrumentalities as herein shown and described.

Referring to the accompanying drawings in which like reference characters indicate like parts throughout:

Figure 1 represents a schematic view of one embodiment of the present invention.

Figure 2 represents a horizontal cross-sectional view, on an enlarged scale, generally along the line 2—2 of Figure 1.

In the embodiment shown in the drawings, water, preferably hot water from any available source, such as process water, may be pumped into a pipe-line as at 5. To this water may be added through the valve 6, fermentation slop from previous fermentations as a source of additional water, sugar and nutrients. Live steam under suitable pressure is introduced into the pipe-line through the steam injector 7 in sufficient amount to raise the temperature of the combined fluids to above 212° F. usually to somewhat above 225° F.

Into the stream of super-heated fluid under pressure, molasses (or other carbohydrate material) is injected through the valve 8, in the proportion necessary to give the desired percentage of carbohydrate in the mash. The temperature of the fluid before the addition of the carbohydrate material is preferably so adjusted that the addition of the latter will bring the temperature of the mixture down to the desired sterilizing temperature. The preferred sterilizing temperature range is 212–300° F.

At approximately the same point, a water solution of the several nutrients necessary or desirable to promote the growth of the fermenting organism, is introduced through the valve 9. The nutrient solution may contain some form of combined phosphorus and/or calcium and/or nitrogen; the composition and proportions of the nutrients varying according to the organism being used and the material being fermented.

The resulting mash, containing nutrients as and if required, is then pumped through the pipe-line 10 by the pump 4 into a closed pressure system made up of a series of elongated upright reservoirs or detention tanks 11, 13, and 15 and the connecting pipe-lines 12, 14, and 16; the purpose of this pressure system being to keep the mash in transit at approximately the original temperature less only such temperature drop as results from the relatively slight heat exchange between the system and the surrounding air. The average time for such passage varies from 50 to 75 minutes according to the relative sterility of the mash as shown by periodic tests thereon.

As shown in the drawings, the reservoirs or tanks 11, 13, and 15 are rounded at their bottoms as at 29 and are provided with upper generally tangential inlet openings 30 and lower mean radial outlet openings 31. That is, as shown particularly in Figure 2, the outlet openings 31 extend downwardly from the rounded bottoms 29 and are preferably disposed generally half-way between the centers and the side-walls thereof.

It is apparent that the mash, which has been tangentially introduced through the inlet opening 30, moves slowly downward along a spiral path until it is drawn off through the mean radial outlet openings 31 at the bottom.

The height of the detention tanks should preferably be 4 to 5 times the inside diameter of the tanks in order to get proper continuous flow therethrough. Also, the diameter of the detention tanks should preferably be not more than approximately 16 times the diameter of the pipe-line; it having been found that if this proportion is far exceeded, there will not be a proper circulation of liquid through the detention system.

It has also been found that the tangential upper introduction of liquid into each tank and the mean radial withdrawal of liquid from each tank aids in maintaining proper circulation and uniformity of composition.

While three tanks are shown in the drawings, it is to be understood that a smaller or a larger number of tanks can be used without departing from the spirit of the present invention.

The mash, upon reaching the pipe-line 16, should, as shown by tests, be completely sterile. The sterile mash is pumped by the pump 17 through the heat exchanger 18 in which it is rapidly cooled by the counter-current of cold water entering at 19 and leaving at 20. It is obvious that any number of heat exchanger units may be used to attain a proper cooling.

The sterile mash, which has been cooled to the fermentation temperature, leaves the heat exchanger 18 through a pipe-line 22 and into it may be injected a suitable inoculum of bacteria through a valve 21. Any of the organisms known to be capable of fermenting carbohydrate with the production of butanol-acetone and/or other solvents may be used. For example, those butanol-acetone producing organisms known by the more or less generic term of *Clostridium acetobutylicum* may be used; the nature and proportion of nutrients being varied according to the particular organism employed and the carbohydrate being fermented.

The organism is preferably added through the vehicle of an inoculated mash with a sufficiently high bacterial content to carry forward the fermentation when added to the sterilized mash.

The inoculated mash is then run into a fermenting tank 23 (two or more may be used) equipped with air vents 24. Instead of having all of the inoculum introduced directly into the pipe-line 22 through the valve 21, it is possible to have part or all of the inoculum introduced into the fermenting tank 23 through the valve 28.

Fermentation of the inoculated mash is then permitted to proceed within the tank 23. Inasmuch as the fermentation generates heat, the temperature of the mash tends to rise and is kept at the desired point by means of cooling water which is sprayed over the tank 23 through the line 25.

Any suitable nutrients necessary or desirable during the fermentation may be added to the mash through the valve 28.

When the fermentation is complete, the mash is drawn from the fermenter through the valve 27 and is sent to suitable stills in which the butyl alcohol, acetone and/or other volatile solvents are recovered in the usual way.

The continuous sterilization of carbohydrate mash according to the present invention has many advantages over conventional methods heretofore employed. Thus, in addition to the simplicity of operation (that is, the elimination of frequent opening and closing of numerous valves, manholes, and vents) heretofore described, the present invention eliminates mechanical agitation, greatly simplifies the introduction of steam, reduces the labor required to approximately ⅓ of that of the batch system, reduces the number of tanks required to approximately 30% of those of the batch system, and reduces the number of valves required to approximately 2% of those of the batch system.

Additionally, the present process utilizes an absolutely uniform steam load at all times. This is of particular importance and represents a marked advantage over conventional batch systems heretofore used in which the steam load varies greatly from time to time. That is, according to the present invention, it is possible to calculate in advance what the steam load will be at all times so that just sufficient equipment is utilized to furnish the desired amount of steam. In the batch system, on the other hand, sufficient boilers and heating capacity must be provided to give the peak steam loads necessary; the equipment operating at only a small fraction of its capacity at other times. It is apparent that this represents a marked saving in fuel as well as a pronounced increase in the efficiency of utilization of equipment.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what I claim as new and desire to be secured by Letters Patent is:

1. A process for sterilizing a carbohydrate mash which comprises heating the mash above 212° F. but below about 300° F., slowly passing the heated mash in a continuous uninterrupted and unconstricted downward spiral, and continuously withdrawing said mash at a lowermost point disposed at the mean radius of the spiral.

2. A process for sterilizing a carbohydrate mash which comprises heating the mash above 212° F. but below about 300° F. in a closed pressure heating system, passing the heated mash horizontally and tangentially into the top of a closed vertical cylindrical pressure detention system, moving said mash slowly along a continuous uninterrupted spiral path downward through said detention system, and withdrawing said mash from said retaining system at the bottom thereof.

3. A process for sterilizing a carbohydrate mash which comprises heating the mash above 212° F. but below about 300° F., slowly passing the heated mash in a continuous uninterrupted and unconstricted downward spiral, said spiral having an axial dimension 4 to 5 times its maximum diameter, and continuously withdrawing said mash at a lowermost point disposed at the mean radius of the spiral.

4. A process for sterilizing a carbohydrate mash which comprises heating the mash above 212° F. but below about 300° F. in a closed pressure heating system, passing the heated mash horizontally and tangentially into the top of a closed vertical cylindrical pressure detention system, moving said mash slowly along a continuous uninterrupted spiral path downward through said detention system, said spiral path having an axial dimension 4 to 5 times its maximum diameter, and withdrawing said mash from the bottom of said retaining system at the mean radius of said spiral path.

5. Apparatus for continuously sterilizing an aqueous carbohydrate mash including a closed vertical cylindrical detention tank having a height approximately 4 to 5 times its diameter, a horizontal tangentially-directed inlet conduit disposed adjacent the top of said tank for continuously introducing a tangential stream of heated mash, a vertical outlet conduit leading from the bottom of said tank for continuously withdrawing mash from said tank, said tank being completely free of internal obstructions whereby said mash can move along an undisturbed downward spiral path from the top to the bottom of said tank.

6. Apparatus for continuously sterilizing an aqueous carbohydrate mash including a closed vertical cylindrical detention tank having a height approximately 4 to 5 times its diameter, a horizontal tangentially-directed inlet conduit disposed adjacent the top of said tank for continuously introducing a tangential stream of heated mash, a vertical outlet conduit leading from the bottom of said tank for continuously withdrawing mash from said tank, said outlet conduit being disposed at the mean radius of said tank, said tank being completely free of internal obstructions whereby said mash can move along an undisturbed downward spiral path from the top to the bottom of said tank.

EDWIN H. CARNARIUS.

REFERENCES CITED

The following references are of record in the file of this patent:

UNITED STATES PATENTS

| Number | Name | Date |
| --- | --- | --- |
| 1,875,536 | Wheeler et al. | Sept. 6, 1932 |
| 1,879,582 | Stout | Sept. 27, 1932 |
| 2,222,306 | Atwood | Nov. 19, 1940 |
| 2,338,227 | Boeckeler | Jan. 4, 1944 |
| 2,304,679 | Christensen | Dec. 8, 1942 |
| 2,343,706 | Reich | Mar. 7, 1944 |
| 2,239,397 | North | Apr. 22, 1941 |
| 2,091,119 | Saint-Jacques | Aug. 24, 1937 |
| 2,135,235 | Hurford et al. | Nov. 1, 1936 |
| 313,431 | Kuhn | Mar. 3, 1885 |
| 930,274 | Doughty | Aug. 3, 1909 |
| 2,370,665 | Jeffreys | Mar. 6, 1945 |